(12) United States Patent
Zhou et al.

(10) Patent No.: US 12,519,602 B2
(45) Date of Patent: Jan. 6, 2026

(54) ASSOCIATING TRANSMISSION RECEPTION POINT WITH CONTROL RESOURCE SET

(71) Applicant: QUALCOMM Incorporated, San Diego, CA (US)

(72) Inventors: Yan Zhou, San Diego, CA (US); Fang Yuan, Beijing (CN); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 18/007,684

(22) PCT Filed: Jul. 31, 2020

(86) PCT No.: PCT/CN2020/106208
§ 371 (c)(1),
(2) Date: Dec. 1, 2022

(87) PCT Pub. No.: WO2022/021327
PCT Pub. Date: Feb. 3, 2022

(65) Prior Publication Data
US 2023/0239123 A1 Jul. 27, 2023

(51) Int. Cl.
*H04L 5/00* (2006.01)
*H04B 7/06* (2006.01)

(52) U.S. Cl.
CPC ....... *H04L 5/0094* (2013.01); *H04B 7/06968* (2023.05); *H04L 5/0053* (2013.01)

(58) Field of Classification Search
CPC ... H04L 5/0094; H04L 5/0053; H04L 5/0023; H04L 5/0044; H04B 7/0695; H04B 7/024; H04W 72/23
See application file for complete search history.

(56) References Cited

U.S. PATENT DOCUMENTS

| | | |
|---|---|---|
| 2019/0021119 A1 | 1/2019 | Ng et al. |
| 2019/0349059 A1 | 11/2019 | John Wilson et al. |

(Continued)

FOREIGN PATENT DOCUMENTS

| | | |
|---|---|---|
| CN | 110637496 A | 12/2019 |
| CN | 111344994 A | 6/2020 |

(Continued)

OTHER PUBLICATIONS

Huawei, et al., "Remaining Issues on Multi-TRP in R16," 3GPP TSG RAN WG1 Meeting #101-e, R1-2003531, 3rd Generation Partnership Project, Mobile Competence Centre, 650, route des Lucioles, F-06921 Sophia-Antipolis Cedex, France, vol. RAN WG1, No. E-meeting, May 25, 2020-Jun. 5, 2020, May 16, 2020, XP051885315, Sections 2.1-2.3, 5 pages.

(Continued)

*Primary Examiner* — Thai Nguyen
(74) *Attorney, Agent, or Firm* — Procopio, Cory, Hargreaves & Savitch LLP

(57) ABSTRACT

In inter-cell mobility, the association between the CORESET and the TRP may be dynamically updated by L1/L2 beam switch signaling, which may cause RRC reconfiguration latency. To address the latency issue, a UE, in one aspect of the disclosure: (1) receives, from a cell, a configuration of a CORESET and a configuration of a set of TRPs; (2) receives, from the cell, an index indication of an index for the CORESET; and (3) determines, based on the index indication, a TRP in the set of TPRs to be associated with the CORESET.

30 Claims, 8 Drawing Sheets

(56) References Cited

U.S. PATENT DOCUMENTS

| | | | | |
|---|---|---|---|---|
| 2020/0351129 A1* | 11/2020 | Kwak | ................... | H04W 72/53 |
| 2022/0132489 A1* | 4/2022 | Kim | ..................... | H04L 5/0094 |
| 2022/0140954 A1* | 5/2022 | Kim | ..................... | H04L 1/1861 370/329 |

FOREIGN PATENT DOCUMENTS

| | | | |
|---|---|---|---|
| EP | 4106437 A1 | 12/2022 | |
| WO | 2019192715 A1 | 10/2019 | |
| WO | 2020102502 A1 | 5/2020 | |

OTHER PUBLICATIONS

OPPO: "Enhancements on Multi-TRP and Multi-Panel Transmission", 3GPP TSG RAN WG1 Meeting #98, R1-1908351, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, XP051764960, 13 Pages, paragraph [ 02.1].
Supplementary European Search Report—EP20947586—Search Authority—The Hague—Mar. 28, 2024.
International Search Report and Written Opinion—PCT/CN2020/106208—ISA/EPO—Apr. 15, 2021.

* cited by examiner

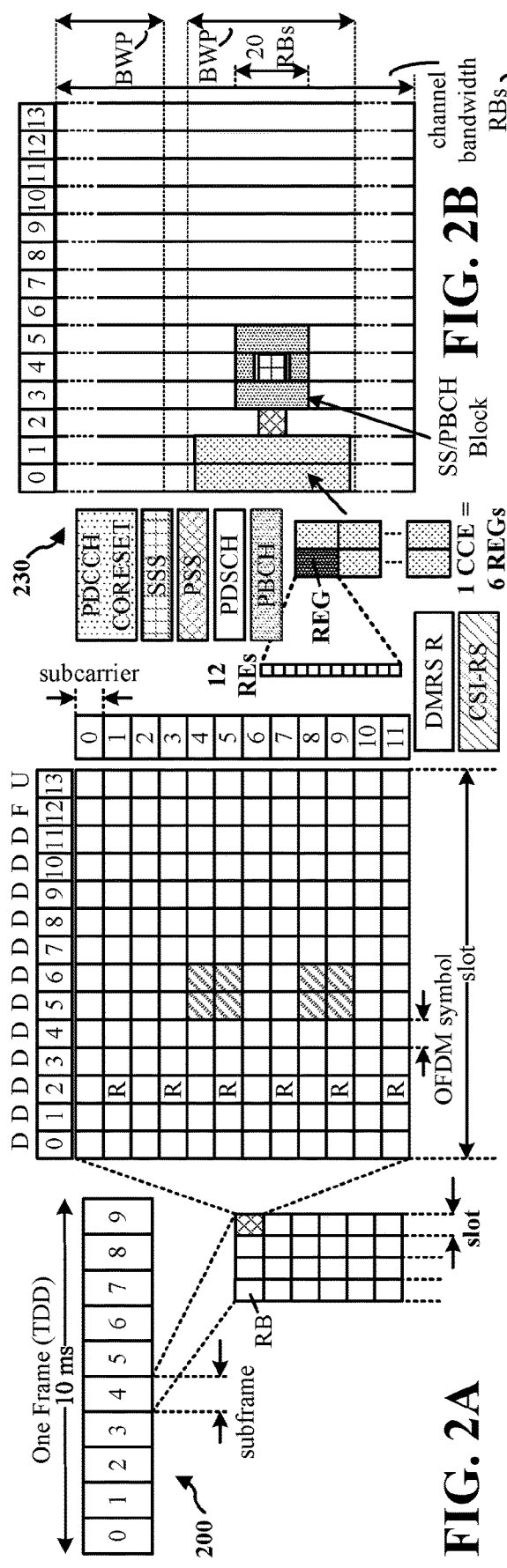
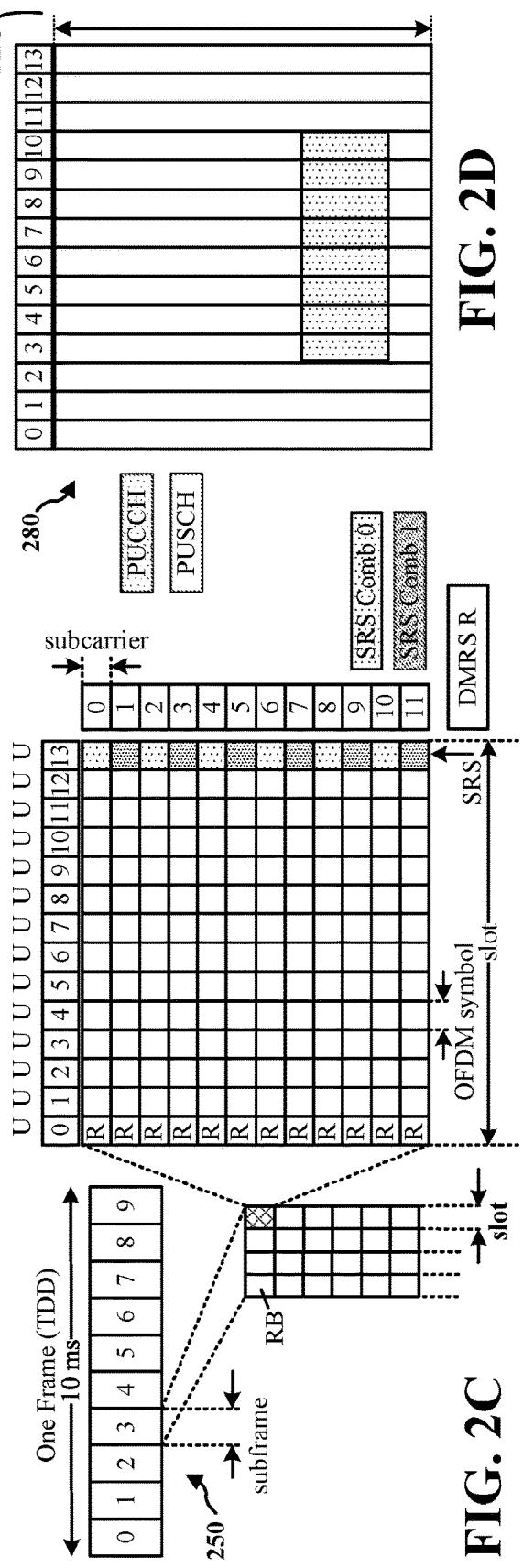
FIG. 2A  FIG. 2B  FIG. 2C  FIG. 2D

ASSOCIATING TRANSMISSION RECEPTION POINT WITH CONTROL RESOURCE SET

CROSS REFERENCE TO RELATED APPLICATIONS

This application is a National Stage Application filed under 35 U.S.C. § 371 of PCT International Application No. PCT/CN2020/106208, entitled "ASSOCIATING TRANSMISSION RECEPTION POINT WITH CONTROL RESOURCE SET" filed Jul. 31, 2020, which is incorporated herein by reference in its entirety.

BACKGROUND

Technical Field

The present disclosure relates generally to communication systems, and more particularly, to dynamically updating an association between transmission reception point and control resource set using L1/L2 signaling.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In multiple DL control information (multi-DCI) based multiple transmit reception point (TRP) of 5G NR, each control resource set (CORESET) may be associated with a TRP using a radio resource control (RRC) configured parameter (e.g., CORESETPoolindex), which may cause the RRC reconfiguration latency. However, in L1/L2 based inter-cell mobility, the CORESET beam may be dynamically switched across serving and non-serving cells. That is, the association between the CORESET and the TRP may be dynamically updated by L1/L2 beam switch signaling.

To overcome the reconfiguration latency, the TRP index per CORESET may be dynamically updated by L1/L2 signaling. In particular, once a configuration of the CORESET and a configuration of a set of TRPs are received at a user equipment (UE) along with an index indication of an index for the CORESET using L1/L2 signaling, the UE determines a TRP in the set of TPRs to be associated with the CORESET based on the index indication. The communication between the UE and the base station may then be based on the index for the CORESET.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
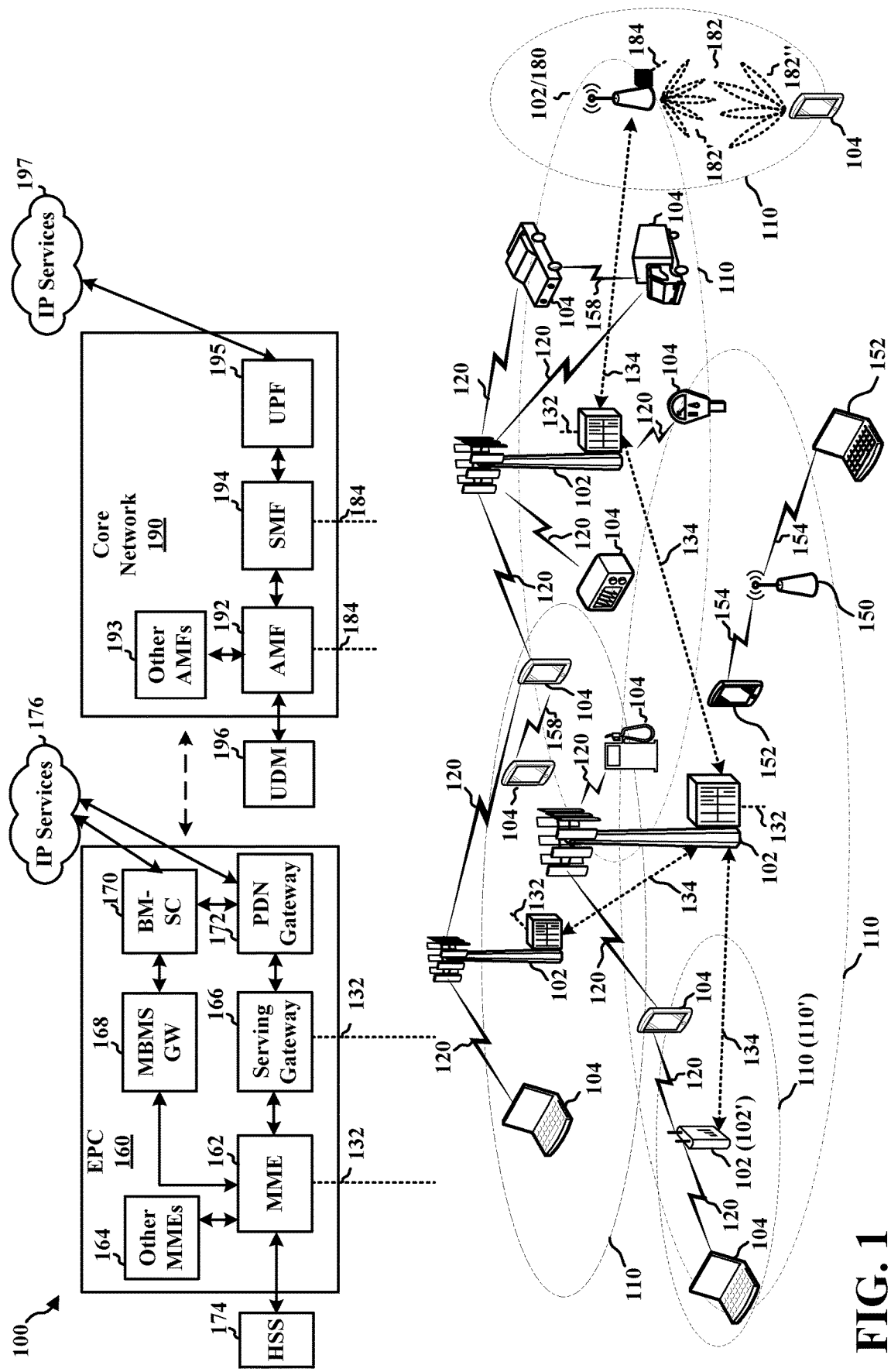
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
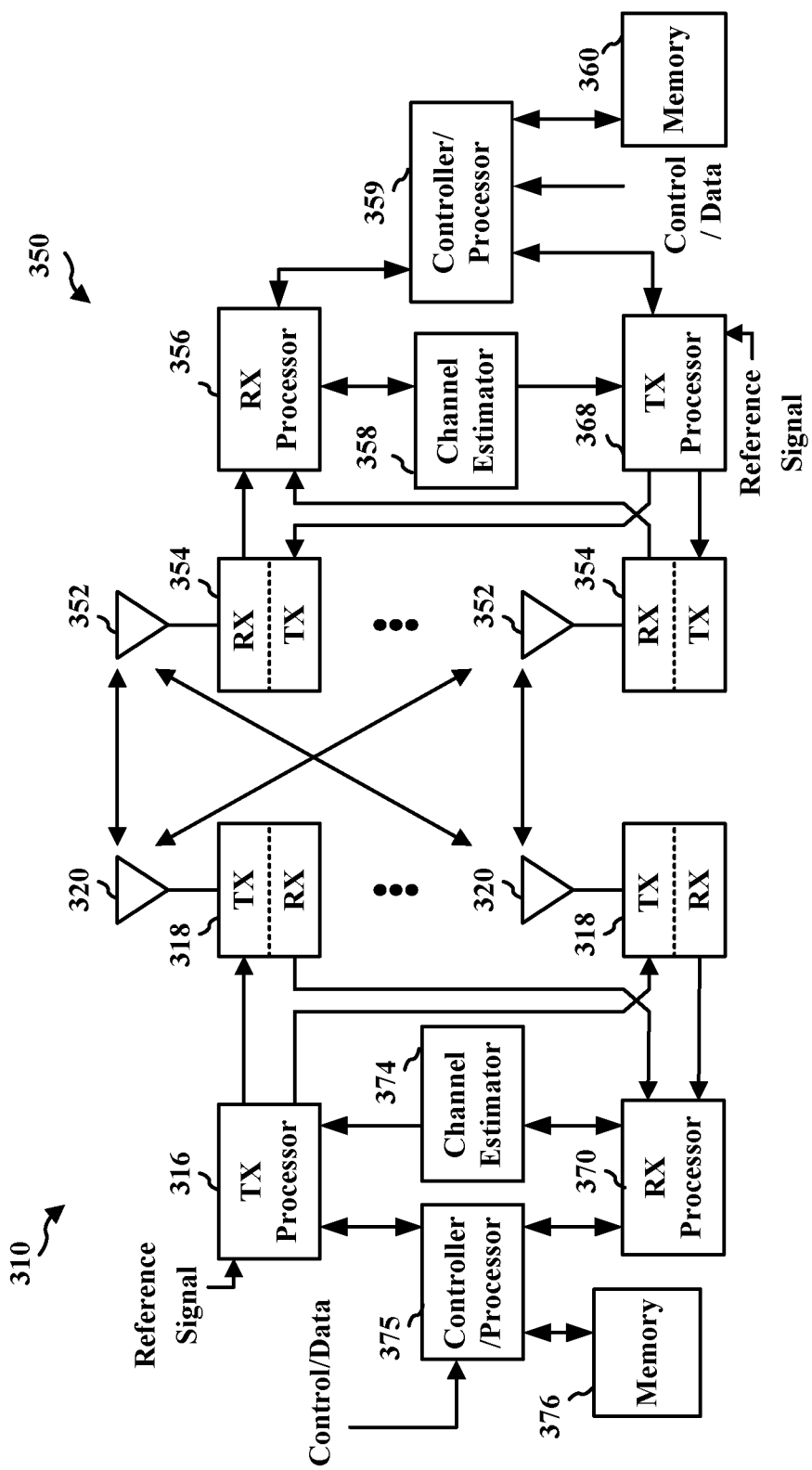
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
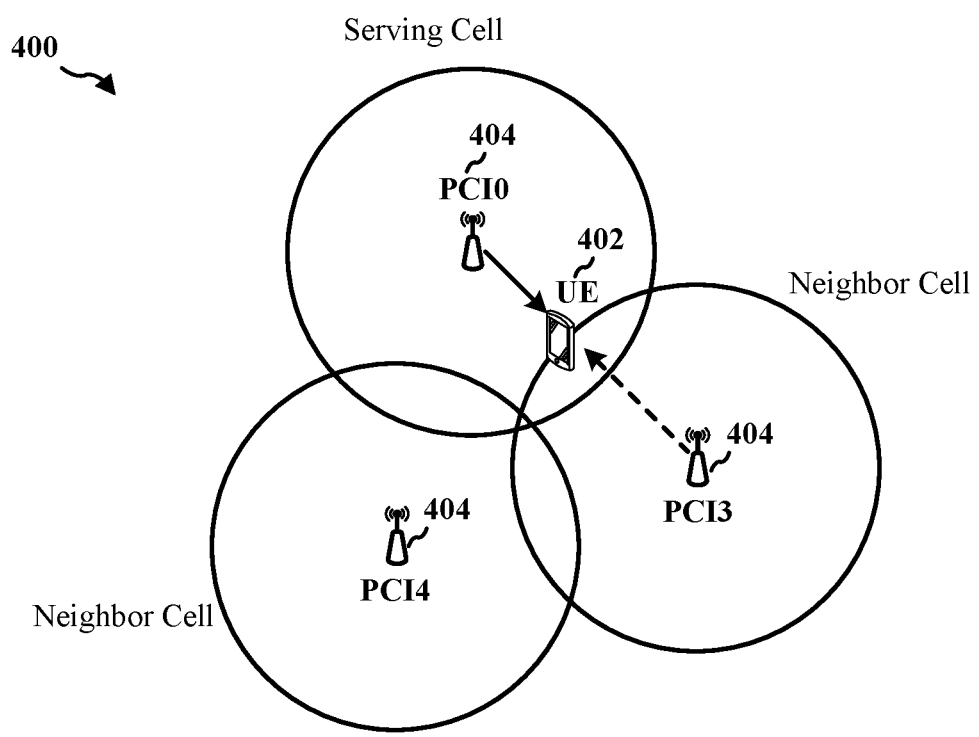
FIG. 4 is a diagram illustrating an example of a beam switching process. The diagram includes a UE and a plurality of base stations.

FIG. 4 is a diagram 400 illustrating an example of a beam switching process. The diagram 400 includes a UE 402 and a plurality of base stations 404. The UE is being served by PCI0 that is associated with a base station 404, while PCI3 and PCI4 are neighbor cells. In the diagram 400 of FIG. 4, L1/L2 inter-cell mobility may occur via beam switching across serving and non-serving cells. In some instances, each serving or non-serving cell may have a single or multiple TRPs (e.g., base station) sharing the same PCI. The example of FIG. 4 includes a configuration with a single TRP per serving or non-serving cell. A TCI state or spatial relation for the downlink/uplink beam of the serving cell may be quasi co-located (QCL) with SSB from the PCI of the same serving cell or a neighbor non-serving cell. For example, as shown in FIG. 4, the TCI state may be QCL with the SSB from PCI0. In some instances, the neighbor non-serving cell may be utilized to provide a beam indication.

Figure 5:
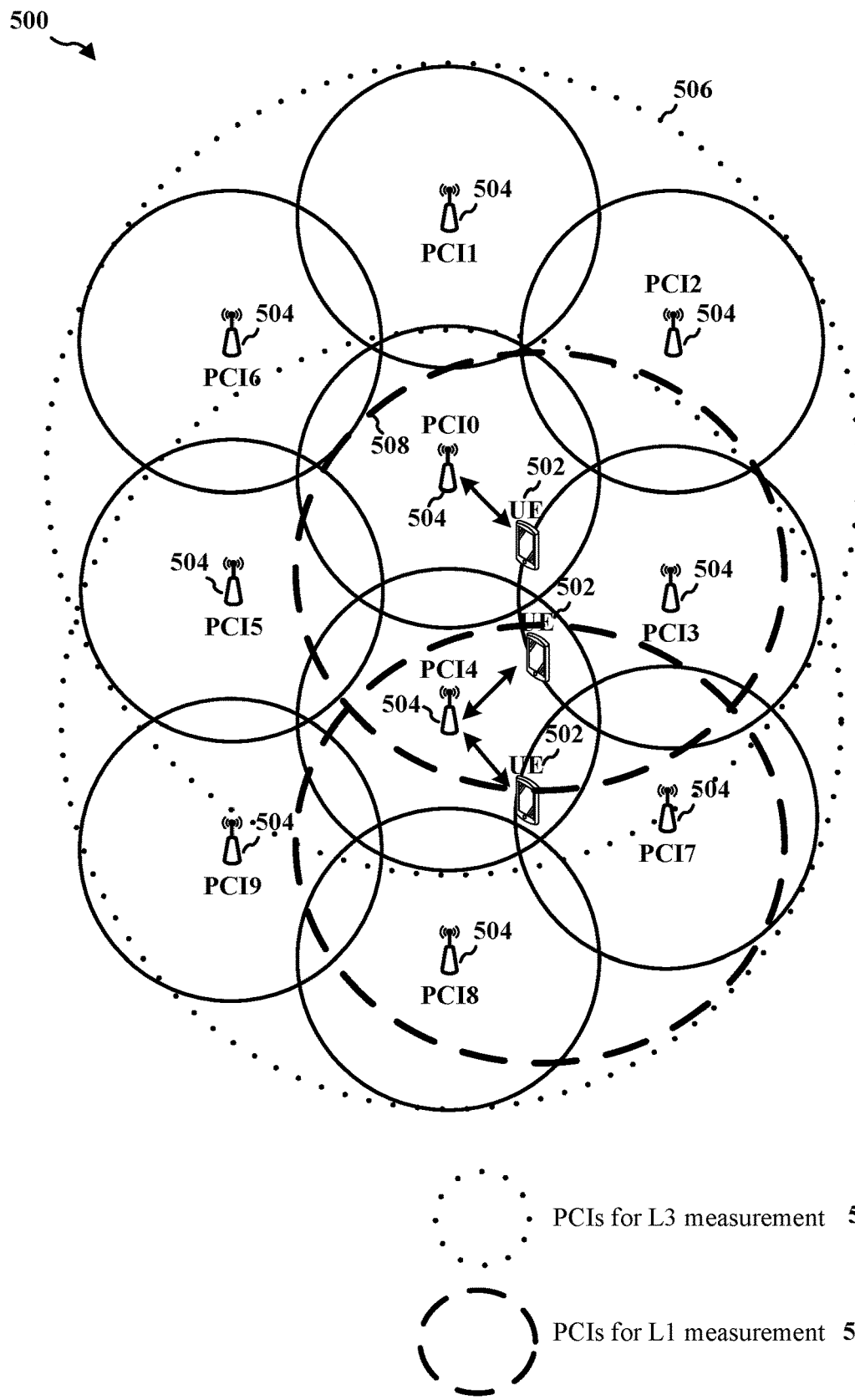
FIG. 5 is a diagram illustrating an example of the beam switching process.

FIG. 5 is a diagram 500 illustrating an example of the beam switching process. The diagram 500 includes a UE 502 and a plurality of base stations 504 and is configured similarly as the UE and the plurality of base stations of FIG. 4. For example, the UE 502 may enter a connected mode state after initial access (IA) on a serving cell with PCI0 504. The UE 502 may measure and report Layer3 (L3) metrics for the detected neighbor PCIs (e.g., PCI1-PCI6). The PCIs that may be included in the L3 measurement 506 may comprise PCI1-PCI6, as shown in FIG. 5. Based on the L3 measurements 506, the network may configure TCI states associated with a subset of the measured neighbor PCIs. For example, the network may configure TCI states associated with PCI0, PCI3, and PCI4, where PCI0, PCI3, and PCI4 are from neighbor non-serving cells. The UE 502 may be further configured with L1 measurements for the configured TCI states. In some aspects, the PCIs (e.g., PCI0, PCI3, PCI4) may be defined as a set of PCIs for L1 measurement 508. For example, the UE 502 may perform L1 measurements of PCI0, PCI3, and PCI4. Based on the L1 measurement, the network may activate a TCI state associated with a neighbor PCI to serve the UE 502. For example, based on the L1 measurements of PCI0, PCI3, and PCI4, the network may activate a TCI state associated with PCI4 to serve the UE 502. The UE may perform an updated L3 report. For example, the updated L3 report may include a different set of PCIs, e.g., PCI0, PCI3-PCI5, and PCI7-PCI5. Based on the updated L3 report, the network may handover the serving cell from PCI0 to PCI4. The network may also configure new TCI states associated with the updated L1 measurement PCI set, e.g., PCI4, PCI7, and PCI5.

Figure 6:
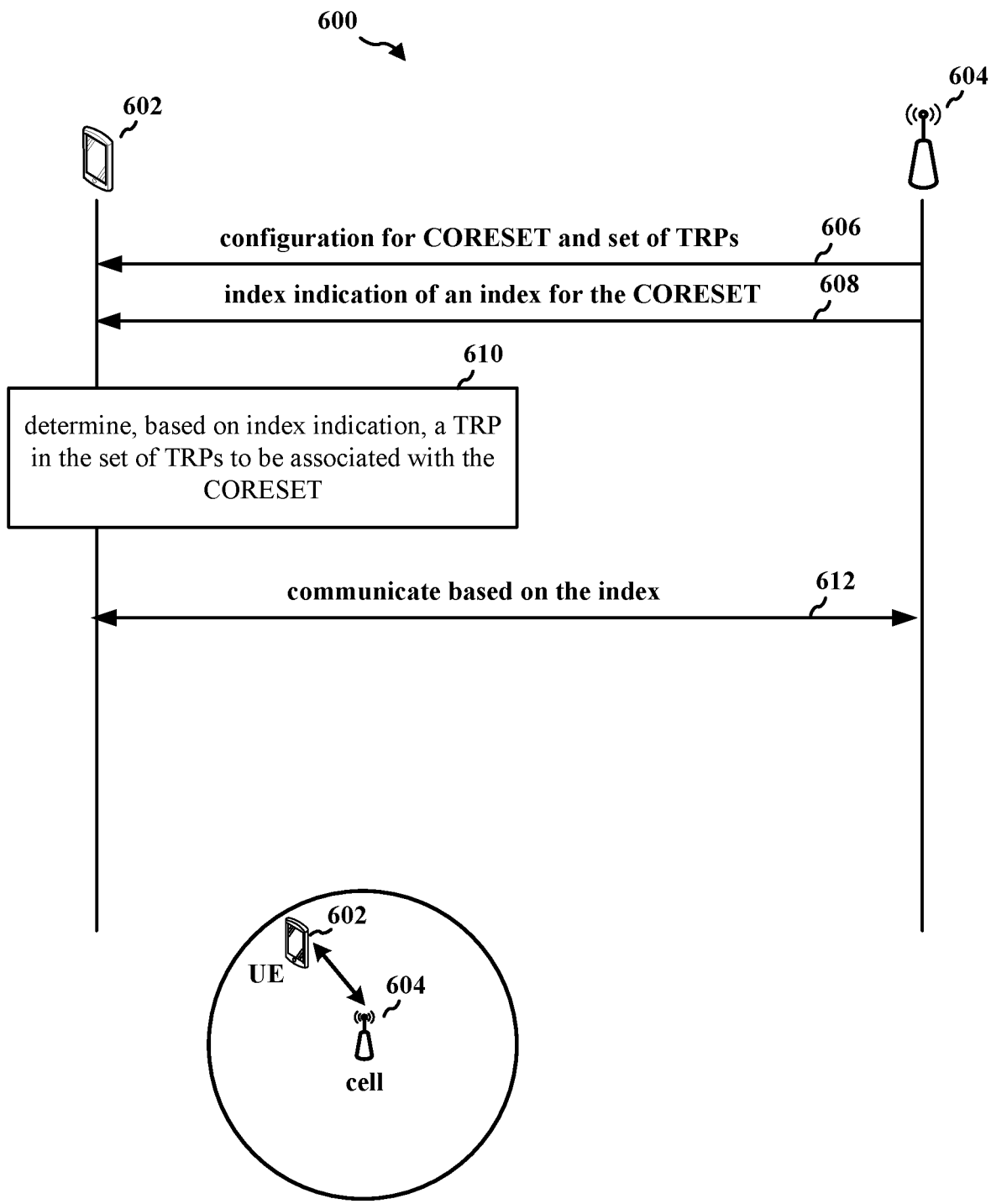
FIG. 6 illustrates a data flow between a UE and a base station that may overcome the RRC reconfiguration latency in accordance with certain aspects of the disclosure.

FIG. 6 illustrates a data flow 600 between a UE 602 and a base station 604 that may overcome the radio resource control (RRC) reconfiguration latency in accordance with certain aspects of the disclosure. The UE 602 may correspond to UE 104 in FIG. 1, UE 350 in FIG. 3, UE 402 in FIG. 4, or UE 502 in FIG. 5. Base station 604 may correspond to base station 102 in FIG. 1, gNB 180 in FIG. 1, base station 310 in FIG. 3, base station 404 in FIG. 4, or base station 504 in FIG. 5. As stated above, the UE 602 and the base station 604 may be configured to operate in millimeter wave frequencies and/or near millimeter wave frequencies. When the base station 604 operates in millimeter wave or near millimeter wave frequencies, the base station 604 may be referred to as a millimeter wave base station. The millimeter wave base station 604 may utilize beamforming with the UE 602 to compensate for the path loss and short range. The base station 604 and the UE 602 may each include a plurality of antennas, such as antenna elements, antenna panels, and/or antenna arrays to facilitate the beamforming.

In L1/L2 based inter-cell mobility, a control resource set (CORESET) beam can be dynamically switched across serving and non-serving cells. That is, the association between the CORESET and a set of transmission reception points (TRPs) can be dynamically updated by L1/L2 beam switch signaling, which may reduce the RRC reconfiguration latency. To overcome the reconfiguration latency, the TRP index per CORESET may be dynamically updated by L1/L2 signaling.

In FIG. 6, the UE 602 may receive from the base station 604, a configuration of the CORESET and a configuration of the TRPs (i.e., 606). The UE 602 may also receive from the base station 604, an index indication 608 of an index for the CORESET using L1/L2 signaling. The UE 602 may further determine, at block 610, a TRP in the set of TPRs (or an TRP index in the set of TRP indexes) to be associated with the CORESET based on the index indication. The communication 612 between the UE 602 and the base station 604 may then be based on the index for the CORESET.

In one aspect, the UE 602 may receive the index indication 608 through downlink control information (DCI). In another aspect, the UE 602 may receive the index indication 608 through a media access control (MAC) control element (CE) (MAC-CE) indicating the index. For example, once the CORESET beam is switched to a new TRP, the base station 604 may send a DCI or MAC-CE to indicate the new TRP index associated with the CORESET.

The UE 602 may determine the index implicitly based on an activated transmission configuration indication (TCI) state. For example, once the CORESET beam is switched to a new beam when a TCI state is activated for the CORESET, the index of new TRP to be associated with the CORESET is implicitly indicated by the index of the TRP transmitting the quasi-co location (QCL) source reference signal in the TCI state.

In one aspect, the UE 602 may determine that the activated TCI state is for the CORESET and indicate a reference signal as QCL of QCL-TypeD source. The index to be associated with the CORESET, in this aspect, is determined to be the same as an index associated with the reference signal.

In another aspect, the UE 602 may determine that the activated TCI state is for the CORESET and indicate a synchronization signal block (SSB) of a physical cell identifier (PCI) as quasi-co location (QCL) of QCL-TypeD source. The index to be associated with the CORESET, in this aspect, is determined based on the reference signal of the SSB of the PCI as a QCL QCL-TypeD source.

For both aspects described above, the index may be one of: a TRP index indicating one of the TRPs; a TRP index associated with a physical cell identifier (PCI) index indicating a PCI; or associated with a cell index indicating the cell. Further, in the case where there is an RRC-configured TRP index for the CORESET, the new TRP index will overwrite the RRC-configured TRP index. That is, the UE 602 may have received an RRC configuration configuring a second index indicating a second TRP associated with the CORESET prior to the index indication, and the index indication may overwrite the second index with the index.

In FIG. 6, the UE 602 may transmit, in one aspect, communication 612 of an acknowledgment (ACK) or negative ACK (NACK) to the base station 604 based on a received physical downlink shared channel (PDSCH) scheduled by the received PDCCH of the CORESET based on the index indicating the association between the TRP and the CORESET.

In another aspect, the UE 602 may receive communication 612 from the base station 604 on a physical downlink shared channel (PDSCH) scheduled by the received PDCCH of the CORESET based on the index indicating the association between the TRP and the CORESET. The received communication 612 may include the PDSCH based on a PDSCH scrambling sequence that is based on the index.

In another aspect, the UE 602 may receive communication 612 from the base station 604 on a physical downlink shared channel (PDSCH) scheduled by the received PDCCH of the CORESET based on the index indicating the association between the TRP and the CORESET. The received communication 612 may include the PDSCH based on a PDSCH rate matching pattern that is based on the index.

Figure 7:
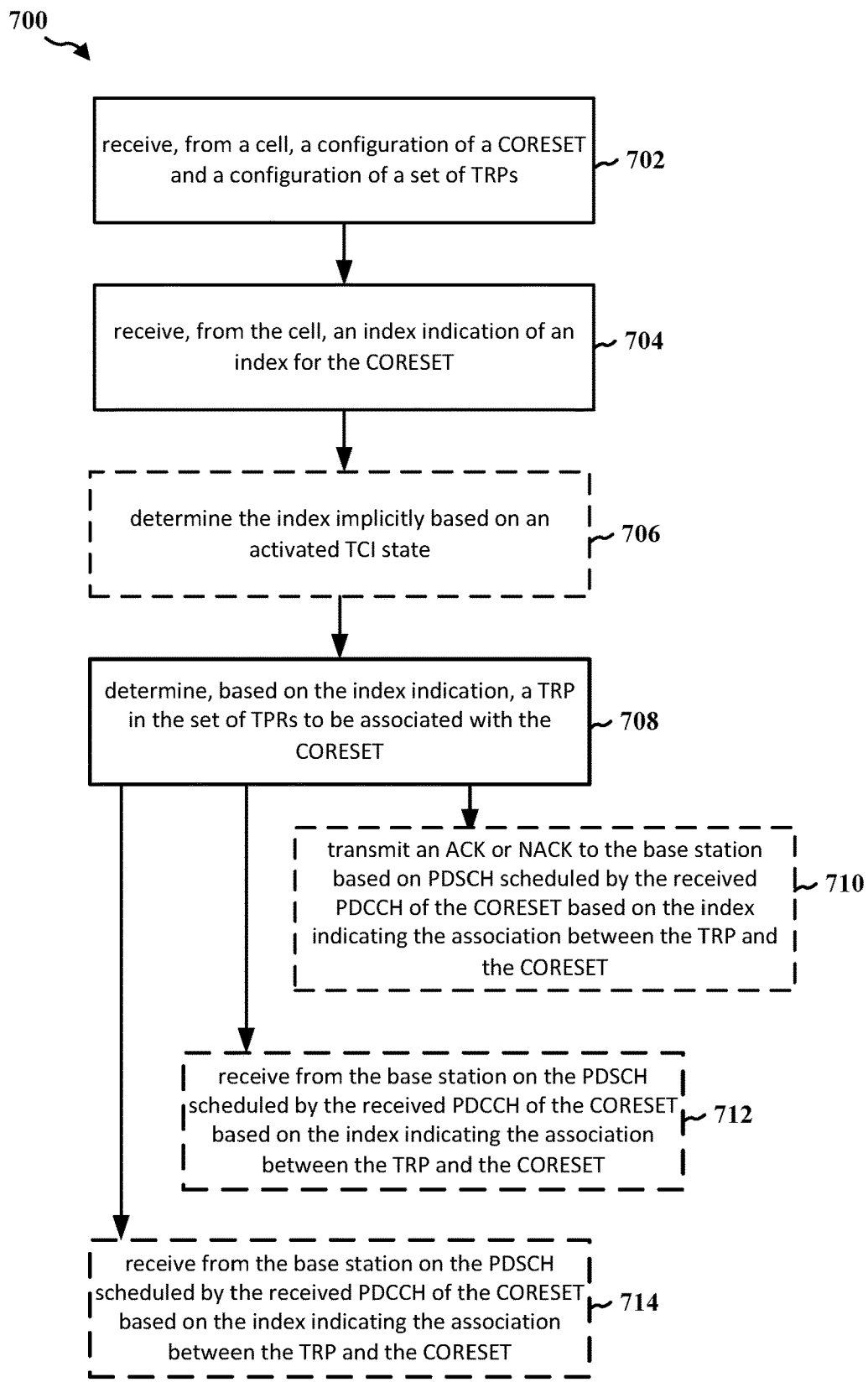
FIG. 7 illustrates a flowchart of a method of wireless communication in accordance with certain aspects of the disclosure.

FIG. 7 illustrates a flowchart 700 of a method of wireless communication in accordance with certain aspects of the disclosure. The method may be performed by a UE (e.g., UE 104 in FIG. 1, UE 350 in FIG. 3, UE 402 in FIG. 4, or UE 502 in FIG. 5) in communication with a base station (e.g., base station 102 in FIG. 1, gNB 180 in FIG. 1, base station 310 in FIG. 3, base station 404 in FIG. 4, or base station 504 in FIG. 5). In FIG. 7, optional operations are indicated with dashed lines.

In FIG. 7, the UE may receive from the base station, at 702, a configuration of the CORESET and a configuration of a set of TRPs. The UE may also receive from the base station, at 704, an index indication of an index for the CORESET using L1/L2 signaling. The communication between the UE and the base station may then be based on the index for the CORESET.

In one aspect, the UE may receive the index indication through downlink control information (DCI). In another aspect, the UE may receive the index indication through a media access control (MAC) control element (CE) (MAC-CE) indicating the index. For example, once the CORESET beam is switched to a new TRP, the base station may send a DCI or MAC-CE to indicate the new TRP index associated with the CORESET.

In FIG. 7, the UE may determine the index implicitly, at 706, based on an activated TCI state. For example, once the CORESET beam is switched to a beam or a new TRP when a TCI state for the CORESET is activated, the new TRP index associated with the CORESET is implicitly indicated by the index of the TRP which transmits the quasi-co location (QCL) source reference signal in the activated TCI state.

In one aspect, the UE may determine that the activated TCI state is for the CORESET and indicate a reference signal as the QCL of QCL-TypeD source. The index to be associated with the CORESET, in this aspect, is determined to be the same as an index associated with the reference signal.

In another aspect, the UE may determine that the activated TCI state is for the CORESET and indicate an SSB of a physical cell identifier (PCI) as QCL of QCL-TypeD source. The index to be associated with the CORESET, in this aspect, is determined based on the reference signal of the SSB of the PCI as a QCL-TypeD source. For example, if a TCI state is activated for a CORESET and has a SSB with PCI4 as a QCL-TypeD RS in the TCI state, an TRP index associated with the CORESET is the index of the TRP which transmits the SSB with PCI4.

For both aspects described above, the index may be one of: a TRP index indicating one of the TRPs; a TRP index associated with a PCI index indicating a PCI; or a TRP index associated with a cell index indicating the cell. Further, in the case where there is an RRC-configured TRP index for the CORESET, the new TRP index will overwrite the RRC-configured TRP index. That is, the UE may have received an RRC configuration configuring a second index indicating a second TRP associated with the CORESET, and the index indication may overwrite the second index with the index.

In FIG. 7, the UE may transmit, at 710, an acknowledgment (ACK) or negative ACK (NACK) to the base station based on a received physical downlink shared channel (PDSCH) scheduled by the received PDCCH of the CORESET based on the index indicating the association between the TRP and the CORESET. For example, UE sends ACK/NACK for PDSCH scheduled by CORESET associated with an TRP index 1 back to the TRP 1 by using uplink channels or resources associated with the TRP index 1.

In FIG. 7, the UE may also receive communication from the base station on the PDSCH scheduled by the received PDCCH of the CORESET based on the index indicating the association between the TRP and the CORESET. In one aspect, at 712, the received communication from the bases station may include the PDSCH based on a PDSCH scrambling sequence that is based on the index. For example, the UE descrambles the PDSCH scheduled by CORESET associated with a TRP index 1 using the PDSCH scrambling sequence associated with the TRP index 1. In another aspect, at 714, the received communication may include the PDSCH based on a PDSCH rate matching pattern that is based on the index. For example, the UE performs a rate matching pattern to the PDSCH receptions scheduled by CORESET associated with a TRP index 1 using the rate matching pattern associated with the TRP index 1.

Figure 8:
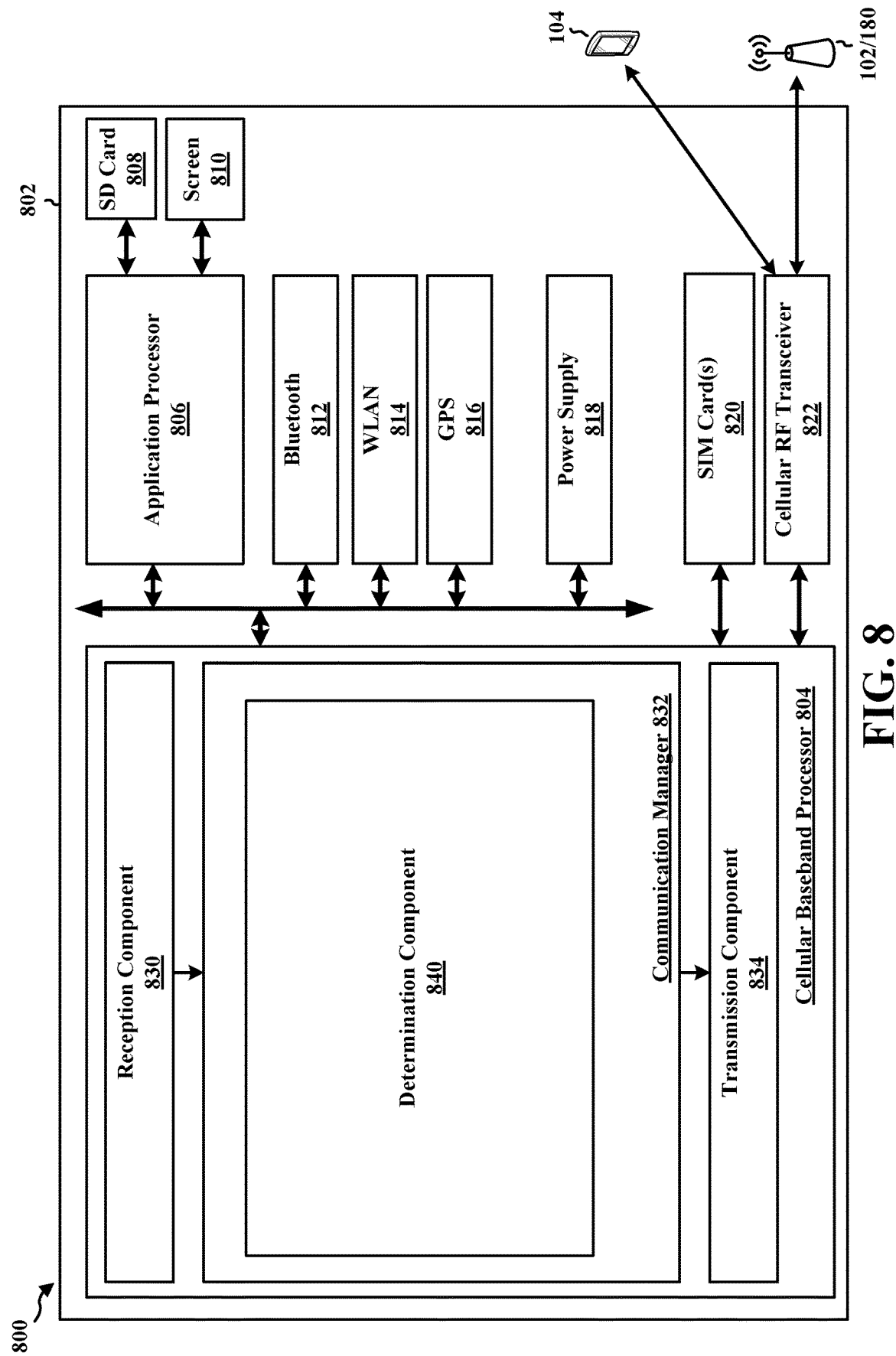
FIG. 8 is a diagram illustrating an example of a hardware implementation for an apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/ memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a determination component 840 that is configured to determine, based on the index indication, a TRP in the set of TRPs to be associated with the CORESET, e.g., as described in connection with FIG. 7. The determination component 840 may also determine the index implicitly based on an activated TCI state.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means. In one configuration, the apparatus 802, and in particular the cellular baseband processor 804, includes means for receiving, from a cell, a configuration of a control resource set (CORESET) and a configuration of a set of transmission reception points (TRPs); means for receiving, from the cell, an index indication of an index for the CORESET; and means for determining, based on the index indication, a TRP in the set of TPRs to be associated with the CORESET. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

What is claimed is:

1. A method of wireless communication of a user equipment (UE), comprising:
receiving, from a cell, a configuration of a control resource set (CORESET) and a configuration of a set of transmission reception points (TRPs);
receiving, from the cell, an indication of an index associated with a TRP in the set of TRPs to be associated with the CORESET, wherein the indication comprises an activation of a transmission configuration indication (TCI) state; and
determining the index associated with the TRP in the set of TRPs to be associated with the CORESET implicitly based on the TCI state.

2. The method of claim 1, wherein the indication is received through at least one of downlink control information (DCI) or a media access control (MAC) control element (CE) (MAC-CE) indicating the activation of the TCI state.

3. The method of claim 1, wherein the TCI state is activated based on a beam for the CORESET being switched in association with inter-cell mobility.

4. The method of claim 1, further comprising determining that the activated TCI state is for the CORESET and indicates a reference signal as quasi-co location (QCL) of QCL-TypeD source, wherein the index to be associated with the CORESET is determined to be a same index as an additional index associated with the reference signal.

5. The method of claim 1, further comprising determining that the activated TCI state is for the CORESET and indicates a synchronization signal block (SSB) of a physical cell identifier (PCI) as quasi-co location (QCL) of QCL-TypeD source, wherein the index to be associated with the CORESET is determined based on the SSB of the PCI as the QCL of QCL-TypeD source.

6. The method of claim 1, wherein the index is a TRP index indicating the TRP.

7. The method of claim 1, wherein the index is associated with a physical cell identifier (PCI) index indicating a PCI associated with the TRP.

8. The method of claim 1, wherein the index is associated with a cell index indicating a cell associated with the TRP.

9. The method of claim 1, further comprising:
receiving, prior to receiving the indication, a radio resource control (RRC) configuration configuring a second index indicating a second TRP is associated with the CORESET; and
overwriting the second index with the index.

10. The method of claim 1, further comprising transmitting an acknowledgment (ACK) or negative ACK (NACK) based on a received physical downlink shared channel (PDSCH) scheduled by a received physical downlink control channel (PDCCH) of the CORESET based on the indication of the TRP to be associated with the CORESET.

11. The method of claim 1, further comprising receiving on a physical downlink shared channel (PDSCH) scheduled by a received physical downlink control channel (PDCCH) of the CORESET based on indication of the TRP to be associated with the CORESET, wherein the receiving comprises receiving the PDSCH based on a PDSCH scrambling sequence that is based on the index.

12. The method of claim 1, further comprising receiving on a physical downlink shared channel (PDSCH) scheduled by a received physical downlink control channel (PDCCH) of the CORESET based on the indication of the TRP to be associated with the CORESET, wherein the receiving comprises receiving the PDSCH based on a PDSCH rate matching pattern that is based on the index.

13. An apparatus for wireless communication, comprising:
memory; and
at least one processor coupled to the memory and configured to:
receive, from a cell, a configuration of a control resource set (CORESET) and a configuration of a set of transmission reception points (TRPs);
receive, from the cell, an indication of an index associated with a TRP in the set of TRPs to be associated with the CORESET, wherein the indication comprises an activation of a transmission configuration indication (TCI) state; and
determine the index associated with the TRP in the set of TRPs is to be associated with the CORESET implicitly based on the TCI state.

14. The apparatus of claim 13, wherein to receive the indication, the at least one processor is configured to receive the indication through at least one of downlink control information (DCI) or a media access control (MAC) control element (CE) (MAC-CE) that indicates the activation of the TCI state.

15. The apparatus of claim 13, wherein the wherein the activation of the TCI state is based on a beam switch for the CORESET in association with inter-cell mobility.

16. The apparatus of claim 13, wherein the at least one processor is further configured to determine that the activated TCI state is for the CORESET and indicates a reference signal as quasi-co location (QCL) of QCL-TypeD source, wherein the index to be associated with the CORESET is determined to be a same index as an additional index associated with the reference signal.

17. The apparatus of claim 13, wherein the at least one processor is further configured to determine that the activated TCI state is for the CORESET and indicates a synchronization signal block (SSB) of a physical cell identifier (PCI) as quasi-co location (QCL) of QCL-TypeD source, wherein the index to be associated with the CORESET is determined based on the SSB of the PCI as the QCL of QCL-TypeD source.

18. The apparatus of claim 13, wherein the index is a TRP index indicating the TRP.

19. The apparatus of claim 13, wherein the index is associated with a physical cell identifier (PCI) index indicating a PCI associated with the TRP.

20. The apparatus of claim 13, wherein the index is associated with a cell index indicating a cell associated with the TRP.

21. The apparatus of claim 13, wherein the at least one processor is further configured to:
receive, prior to reception of the indication, a radio resource control (RRC) configuration configuring a second index indicating a second TRP is associated with the CORESET; and
overwrite the second index with the index.

22. The apparatus of claim 13, wherein the at least one processor is further configured to transmit an acknowledgment (ACK) or negative ACK (NACK) based on a received physical downlink shared channel (PDSCH) scheduled by a received physical downlink control channel (PDCCH) of the CORESET based on the indication of the TRP to be associated with the CORESET.

23. The apparatus of claim 13, wherein the at least one processor is further configured to receive on a physical downlink shared channel (PDSCH) scheduled by a received physical downlink control channel (PDCCH) of the CORESET based on the indication of the TRP to be associated with the CORESET, wherein the receiving comprises receiving the PDSCH based on a PDSCH scrambling sequence that is based on the index.

24. The apparatus of claim 13, wherein the at least one processor is further configured to receive on a physical downlink shared channel (PDSCH) scheduled by a received physical downlink control channel (PDCCH) of the CORESET based on the indication of the TRP to be associated with the CORESET, wherein the receiving comprises receiving the PDSCH based on a PDSCH rate matching pattern that is based on the index.

25. An apparatus for wireless communication, the apparatus being a device at a user equipment (UE), comprising:
   means for receiving, from a cell, a configuration of a control resource set (CORESET) and a configuration of a set of transmission reception points (TRPs);
   means for receiving, from the cell, an indication of an index associated with a TRP in the set of TRPs to be associated with the CORESET, wherein the indication comprises an activation of a transmission configuration indication (TCI) state; and
   means for determining the index associated with the TRP in the set of TRPs to be associated with the CORESET implicitly based on the TCI state.

26. The apparatus of claim 25, wherein the indication is received through at least one of downlink control information (DCI) or a media access control (MAC) control element (CE) (MAC-CE) indicating the activation of the TCI state.

27. The apparatus of claim 25, wherein the TCI state is activated based on a beam for the CORESET being switched in association with inter-cell mobility.

28. The apparatus of claim 25, further comprising:
   means for determining that the activated TCI state is for the CORESET and indicates a reference signal as quasi-co location (QCL) of QCL-TypeD source, wherein the index to be associated with the CORESET is determined to be a same index as an additional index associated with the reference signal.

29. The apparatus of claim 25, further comprising:
   means for determining that the activated TCI state is for the CORESET and indicates a synchronization signal block (SSB) of a physical cell identifier (PCI) as quasi-co location (QCL) of QCL-TypeD source, wherein the index to be associated with the CORESET is determined based on the SSB of the PCI as the QCL of QCL-TypeD source.

30. The apparatus of claim 25, wherein the index is a TRP index indicating the TRP.

* * * * *